US012523081B2

(12) United States Patent
Lu et al.

(10) Patent No.: US 12,523,081 B2
(45) Date of Patent: Jan. 13, 2026

(54) MOUNTING STRUCTURE OF EJECTION MECHANISM OF DISHWASHER AND DISHWASHER

(71) Applicant: FOSHAN SHUNDE MIDEA WASHING APPLIANCES MANUFACTURING CO., LTD., Guangdong (CN)

(72) Inventors: Jialiang Lu, Guangdong (CN); Zhao Yuan, Guangdong (CN); Yu Lin, Guangdong (CN); Jiangang Mo, Guangdong (CN); Chengying Zhao, Guangdong (CN)

(73) Assignee: FOSHAN SHUNDE MIDEA WASHING APPLIANCES MANUFACTURING CO., LTD., Guangdong (CN)

( * ) Notice: Subject to any disclaimer, the term of this patent is extended or adjusted under 35 U.S.C. 154(b) by 193 days.

(21) Appl. No.: 18/210,956

(22) Filed: Jun. 16, 2023

(65) Prior Publication Data

US 2024/0011345 A1 Jan. 11, 2024

(30) Foreign Application Priority Data

Jul. 6, 2022 (CN) ........................ 202221730009.4

(51) Int. Cl.
*E05F 15/616* (2015.01)
*A47L 15/42* (2006.01)

(52) U.S. Cl.
CPC ........ *E05F 15/616* (2015.01); *A47L 15/4259* (2013.01); *E05Y 2900/304* (2013.01)

(58) Field of Classification Search
CPC .............. E05F 15/4251; E05F 15/4259; A47L 15/4259; E05Y 2900/304
See application file for complete search history.

(56) References Cited

U.S. PATENT DOCUMENTS

2013/0057134 A1* 3/2013 Kilic .................... A47L 15/488 312/319.8
2016/0130854 A1* 5/2016 Carli ....................... F16H 19/04 74/32

(Continued)

FOREIGN PATENT DOCUMENTS

CN 108553064 A * 9/2018 ......... A47L 15/4259
CN 113812899 A * 12/2021
CN 116158712 A * 5/2023

OTHER PUBLICATIONS

English translation of CN 108553064 (Year: 2025).*

*Primary Examiner* — Daniel J Rohrhoff
(74) *Attorney, Agent, or Firm* — Scully, Scott, Murphy & Presser, P.C.

(57) ABSTRACT

A mounting structure of an ejection mechanism of a dishwasher, and a dishwasher are disclosed. The mounting structure has an inner container and the ejection mechanism. The inner container has an open side for mounting a door body, and is provided with a positioning rib. The ejection mechanism has a drive assembly and an ejector connected with the drive assembly. The drive assembly drives the ejector to perform a protruding and retracting movement between the open side and the door body. The drive assembly is arranged on the positioning rib and fixedly connected with the inner container. The drive assembly is provided with a support foot extending toward the positioning rib. The support foot abuts against a side of the positioning rib which is adjacent to the door body.

15 Claims, 9 Drawing Sheets

(56) References Cited

U.S. PATENT DOCUMENTS

| | | | | |
|---|---|---|---|---|
| 2020/0263478 | A1* | 8/2020 | Yaman | D06F 34/20 |
| 2023/0068193 | A1* | 3/2023 | Park | A47L 15/4251 |
| 2024/0008710 | A1* | 1/2024 | Lu | E05F 15/616 |
| 2024/0292999 | A1* | 9/2024 | Sartori | A47L 15/4259 |
| 2024/0410210 | A1* | 12/2024 | Spiessl | E05F 15/616 |

* cited by examiner

MOUNTING STRUCTURE OF EJECTION MECHANISM OF DISHWASHER AND DISHWASHER

CROSS-REFERENCE TO RELATED APPLICATION

The application claims the priority to Chinese Patent Application No. 202221730009.4, filed on Jul. 6, 2022, which is incorporated herein by reference in its entirety. No new matter has been introduced.

TECHNICAL FIELD

The present disclosure relates to the technical field of kitchen appliances, and in particular, to a mounting structure of an ejection mechanism of a dishwasher, and a dishwasher.

BACKGROUND

With the improvement of life quality of people, dishwashers are becoming more and more popular. In related arts, some dishwashers are usually provided with an ejection mechanism on an inner container of the dishwashers to realize an automatic door opening function. However, the ejection mechanism and the inner container are only simply fixed by screws, and therefore a pre-positioned mounting cannot be realized. The ejection mechanism is prone to deviation and loosening after being subject to repeated stress, and therefore a mounting reliability is low.

SUMMARY

A main purpose of the present disclosure is to propose a mounting structure of an ejection mechanism of a dishwasher, to be at least capable of realizing a pre-positioned mounting of the ejection mechanism and further improving a mounting reliability of the ejection mechanism.

In accordance with an embodiment of the disclosure, a mounting structure of an ejection mechanism of a dishwasher is provided which may include: an inner container having an open side for mounting a door body, the inner container being provided with a positioning rib; and an ejection mechanism including a drive assembly and an ejector drivingly connected to the drive assembly, the drive assembly being used to drive the ejector to perform a protruding and/or retracting movement between the open side and the door body, the drive assembly being arranged on the positioning rib and fixedly connected to the inner container, the drive assembly being further provided with a support foot extending toward the positioning rib, the support foot abutting against a side of the positioning rib which is adjacent to the door body.

In some embodiments, the drive assembly may be fixed on a top of the inner container, a bottom of the drive assembly being provided with the support foot, the top of the inner container being provided with the positioning rib.

In some embodiments, the support foot may include: an abutting part, which abuts against and fits with the positioning rib; and a reinforcement part, which is arranged on a side of the abutting part away from the positioning rib.

In some embodiments, the drive assembly may include a housing and a drive unit disposed in the housing, an end of the ejector being drivingly connected to the drive unit, another end of the ejector passing out of the housing, the support foot being arranged on a surface of the housing.

In some embodiments, the housing may have a support surface abutting against a top of the positioning rib, the support surface being provided with a plurality of support feet at intervals thereon, each support foot abutting and fitting with a corresponding positioning rib on the inner container.

In some embodiments, the plurality of support feet may be arranged in multiple rows at intervals in a protruding and/or retracting direction of the ejector, a plurality of positioning ribs corresponding to a plurality of support feet in a same row being connected to one another to form a transverse rib strip.

In some embodiments, the inner container may be further provided with a longitudinal rib strip which intersects with the transverse rib strip, the longitudinal rib strip connecting multiple rows of the transverse rib strips to one another.

In some embodiments, two opposite sides of the housing may be respectively provided with a mounting lug, the inner container being provided with a fixing column corresponding to the mounting lug, the mounting lug being overlapped on a top surface of the fixing column, the mounting lug and the fixing column each being correspondingly provided with assembling holes for fasteners to pass through for connecting.

In some embodiments, an outer periphery of the open side may be provided with a reinforcement rib.

In accordance with another embodiment of the disclosure, a dishwasher is provided, which may include the mounting structure of the ejection mechanism of the dishwasher as described above.

In some technical solutions according the embodiments of the present disclosure, the inner container is provided with the positioning rib, and the drive assembly is provided with the support foot extending toward the positioning rib. During the assembly process, the drive assembly is arranged on the positioning rib, and the support foot is abutted against a side of the positioning rib adjacent to the door body. Thus, a pre-positioning of the ejection mechanism can be realized. Then the drive assembly is fixedly connected to the inner container by a fastener. As such, a simple and convenient assembly can be achieved. When the door body needs to be opened, the drive assembly drives the ejector to protrude toward the door body. The ejector abuts against the door body to apply an acting force to the door body, and the door body will produce a reverse acting force to the ejector. Since the support foot abuts against a side of the positioning rib adjacent to the door body, the support foot can bear the reverse acting force of the door body on the ejection mechanism to avoid the ejection mechanism from shifting and loosening after being repeatedly stressed, which can effectively improve the mounting reliability of the ejection mechanism. The above-described mounting structure of the ejection mechanism of the dishwasher can realize the pre-positioned mounting of the ejection mechanism, and can also improve the mounting reliability of the ejection mechanism.

BRIEF DESCRIPTION OF DRAWINGS

In order to more clearly illustrate the technical solutions in the embodiments of the present disclosure or the related arts, the following will briefly introduce the accompanying drawings that need to be used in the description of the embodiments or the related arts. Obviously, the accompanying drawings in the following description are only some embodiments of the present disclosure, and those skilled in the art can also obtain other drawings according to the structures shown in these drawings without creative work.

Figure 1:
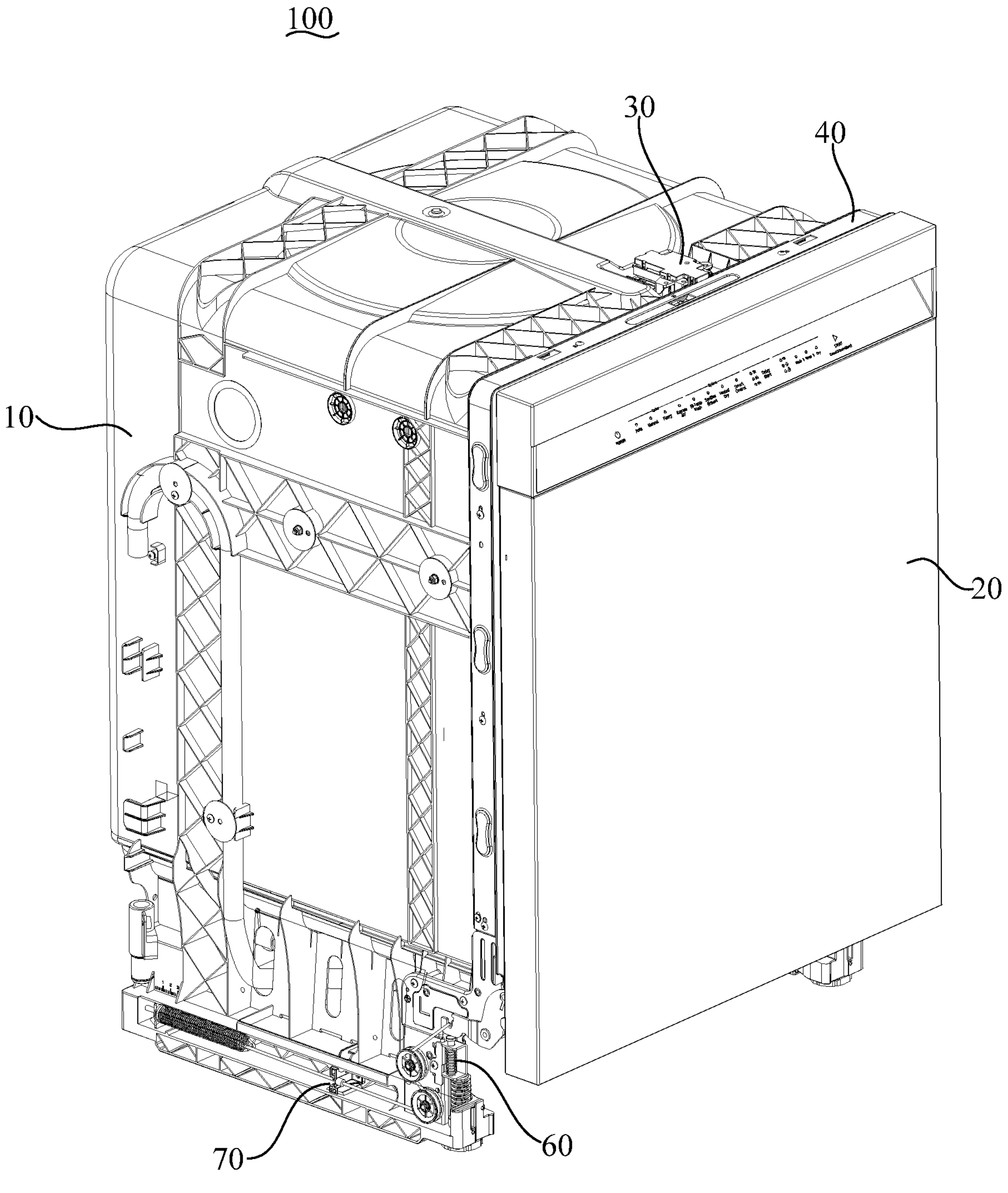
FIG. 1 is a schematic structural diagram of a dishwasher according to some embodiments of the present disclosure.

Explanation of reference numbers shown in the figures is provided in the following table.

| Reference number | Name | Reference number | Name |
|---|---|---|---|
| 100 | dishwasher | 3111 | abutting part |
| 10 | inner container | 3112 | reinforcement part |
| 101 | open side | 312 | housing |
| 11 | positioning rib | 3121 | support surface |
| 12 | longitudinal rib strip | 313 | drive unit |
| 13 | fixing column | 314 | mounting lug |
| 14 | turnup edge | 315 | assembling hole |
| 141 | through hole | 32 | ejector |
| 20 | door body | 40 | reinforcement rib |
| 30 | ejection mechanism | 50 | door lock mechanism |
| 31 | drive assembly | 60 | auxiliary door opening mechanism |
| 311 | support foot | 70 | positioning mechanism |

The realization of a purpose, functional characteristics and advantages of the present disclosure will be further described in conjunction with the embodiments and with reference to the accompanying drawings.

DESCRIPTION OF EMBODIMENTS

The technical solutions in the embodiments of the present disclosure will be clearly and completely described below in conjunction with the accompanying drawings in the embodiments of the present disclosure. Obviously, the described embodiments are only part of the embodiments of the present disclosure, not all of the embodiments. Based on the embodiments of the present disclosure, all other embodiments obtained by persons of ordinary skill in the art without making creative efforts belong to the scope of protection of the present disclosure.

It should be noted that, if there are directional indications (such as up, down, left, right, front, back . . . ) in embodiments of the present disclosure, the directional indications are only used to explain a relative position relationship and/or a state of motion among various components in a specific posture. If the specific posture changes, the directional indication will also change accordingly.

In addition, if there are descriptions involving "first", "second" etc. in the embodiments of the present disclosure, the descriptions of "first", "second", etc. are used only for a purpose of description and shall not be understood to indicate or imply their relative importance, or designate implicitly the number of technical features indicated. Therefore, the features defined with "first" and "second" may explicitly or implicitly include at least one of the features. In addition, if an expression of "and/or" or "as well as/or" appears throughout the text, its meaning includes three parallel schemes. The expression of "A and/or B" is taken as an example, which includes a scheme including A, or a scheme including B, or a scheme in which A and B are included at the same time. In addition, the technical solutions of the various embodiments can be combined with each other, but a technical solution combined by technical solutions of the various embodiments shall be capable of being realized by those skilled in the art. When a combination of technical solutions is contradictory or cannot be realized, it should be considered that the combination of technical solutions does not exist, and is not within a scope of protection sought for by the present disclosure.

A dishwasher 100 is provided according to some embodiments of the present disclosure.

Figure 2:
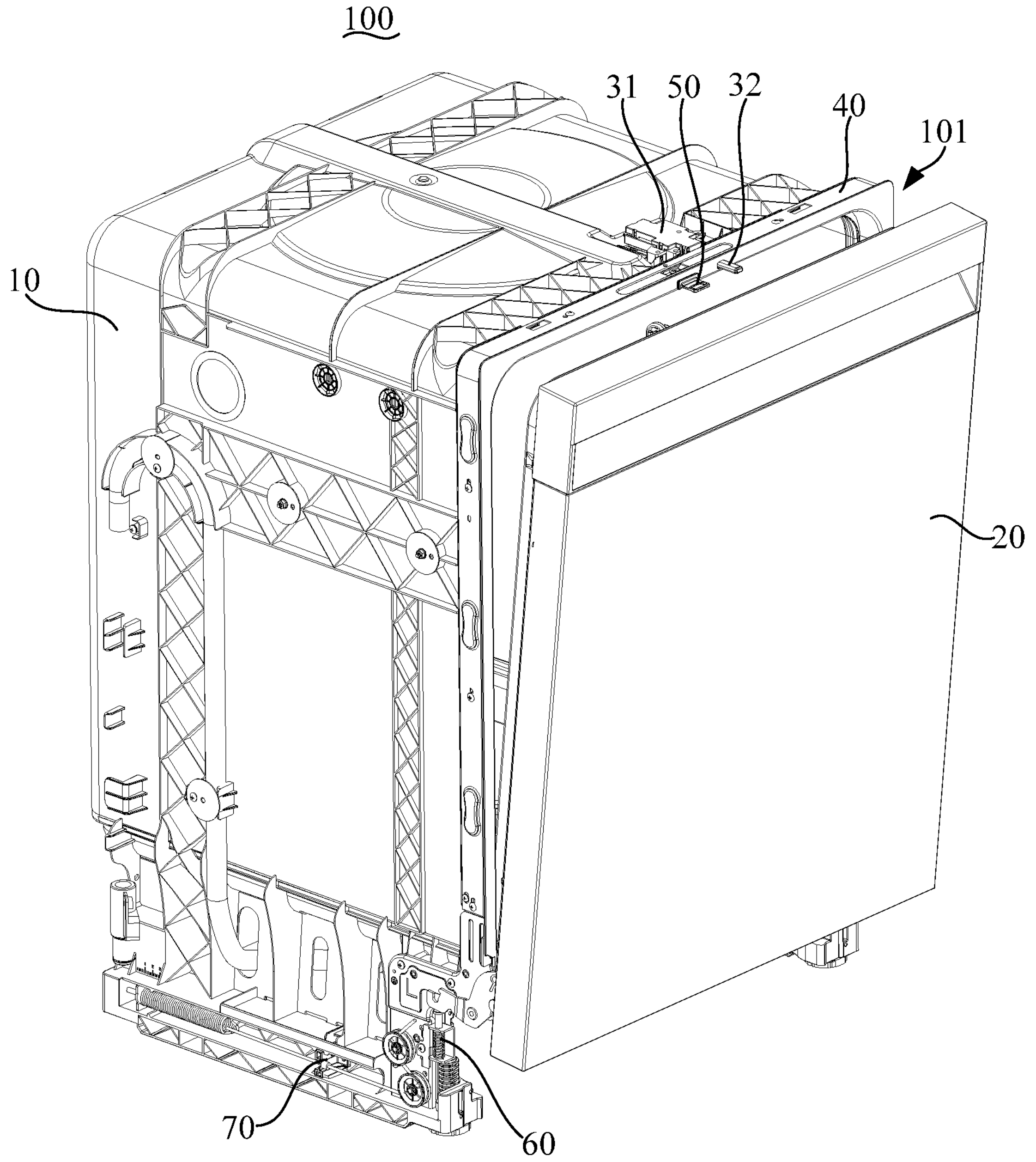
FIG. 2 is a structural schematic diagram of the dishwasher shown in FIG. 1 with a door body is in an open state.

FIG. 1 is a schematic structural diagram of a dishwasher according to some embodiments of the present disclosure. FIG. 2 is a structural schematic diagram of the dishwasher shown in FIG. 1 with a door body is in an open state.

As shown in FIG. 1 and FIG. 2, according to some embodiments of the present disclosure, the dishwasher 100 may include an inner container 10, a door body 20, a door lock mechanism 50 and an ejection mechanism 30. The inner container 10 may have a washing chamber and an opening which is in communication with the washing chamber. The door body 20 may be rotatably connected to the inner container 10. The door body 20 may be used to open or close the opening. The door lock mechanism 50 may be used to lock the door body 20 with the inner container 10. The ejection mechanism 30 may be provided on the inner container 10, and used to exert an acting force on the door body 20, to cause the door body 20 to be unlocked from the inner container 10.

In some embodiments, during a washing process of the dishwasher 100, the door body 20 may close the opening of the inner container 10, and the door lock mechanism 50 locks the door body 20 with the inner container 10 to ensure safety of the washing process of the dishwasher 100. When the door body 20 needs to be opened, the ejection mechanism 30 may exert an acting force on the door body 20 to unlock the door body 20 from the inner container 10, and then the door body 20 can be opened. In some embodiments, the door lock mechanism 50 may include a locking piece arranged on the inner container 10 and a locking fitting piece arranged on the door body 20. The locking piece and the locking fitting piece can be locked together by way of fastening, magnetic fixation, etc . . . In some embodiments, the ejection mechanism 30 may include a drive assembly 31 and an ejector 32 drivingly connected to the drive assembly 31. The drive assembly 31 may drive the ejector 32 to approach or move away from the door body 20. As shown in FIG. 1, when the door body 20 is closed, the drive assembly 31 drives the ejector 32 to move toward a side away from the door body 20 to a retracted position. At this time, the ejector 32 may not interfere with a normal closing of the door body 20. As shown in FIG. 2, when the door body 20 needs to be opened, the drive assembly 31 drives the ejector 32 to move toward a side adjacent to the door body 20 to a protruding position. The ejector 32 may abut against the door body 20 in a process of protruding, to apply a thrust to the door body 20, and then the locking piece of the door lock mechanism 50 can be separated from the locking fitting piece, to unlock the door body 20 from the inner container 10.

After the door body 20 and the inner container 10 are unlocked, in order to enable the door body 20 to be further automatically opened to a preset open position, in some embodiments, the dishwasher 100 also includes an auxiliary door opening mechanism 60. The auxiliary door opening mechanism 60 may be used to apply an acting force to the door body 20 or a hinge on the door body 20, to enable the door body 20 to rotate and open relative to the inner container 10. In some embodiments, a bottom of the door body 20 is rotatably connected to the inner container 10 by a hinge. The auxiliary door opening mechanism 60 may be used to apply the acting force to the hinge, to cause that the door body 20 may exhibit a tendency to rotate and open relative to the inner container 10. In some embodiments, the auxiliary door opening mechanism 60 may include a bracket, an abutting member and an elastic member. The bracket may be fixed to the inner container 10. The abutting member may be movably mounted on the bracket. The elastic member is disposed between the bracket and the abutting member, and used to provide a maintaining force for the abutting member to abut against the hinge.

In some embodiments, in order to enable the door body 20 to be automatically opened and maintained at a preset open position, the dishwasher 100 may further include a positioning mechanism 70. The positioning mechanism 70 may be used to enable the door body 20 to be in the preset open position relative to the inner container 10. In some embodiments, when the ejection mechanism 30 unlocks the door body 20 from the inner container 10, the auxiliary door opening mechanism 60 may drive the door body 20 to rotate and open relative to the inner container 10. When the door body 20 rotates and opens to a certain angle relative to the inner container 10, the positioning mechanism 70 may exert an acting force on the door body 20 to enable the door body 20 to suspend at the preset open position. In some embodiments, the positioning mechanism 70 may include a tension spring, a first pull cord, a second pull cord, a positioning piece and a positioning fitting piece. The positioning piece may be fixed between the first pull cord and the second pull cord. An end of the first pull cord far away from the positioning member is connected to the inner container 10 by the tension spring. An end of the second pull cord far away from the positioning member is connected to the hinge. The positioning fitting piece is fixed to the inner container 10, and the positioning fitting piece is limitedly abutted against a side of the positioning fitting piece that is away from the door body 20.

Since the dishwasher 100 will frequently be opened or closed during daily use, the ejection mechanism 30 will frequently exert an acting force on the door body 20, and the ejection mechanism 30 will also be subject to a reverse acting force from the door body 20. The reverse acting force from the door body 20 to the ejection mechanism 30 will have a certain impact on the ejection mechanism 30. The ejection mechanism 30, if not mounted stably, may be deflected and loosened under the action of external force, which will lead to a failure of realizing an automatic door opening function. Therefore, a mounting stability of the ejection mechanism 30 is very important. Based on this, the present application proposes a mounting structure of the ejection mechanism of the dishwasher, which can improve the mounting reliability of the ejection mechanism 30 and can also realize a rapid pre-positioned mounting of the ejection mechanism 30.

The present disclosure proposes the mounting structure of the ejection mechanism of the dishwasher.

Figure 3:
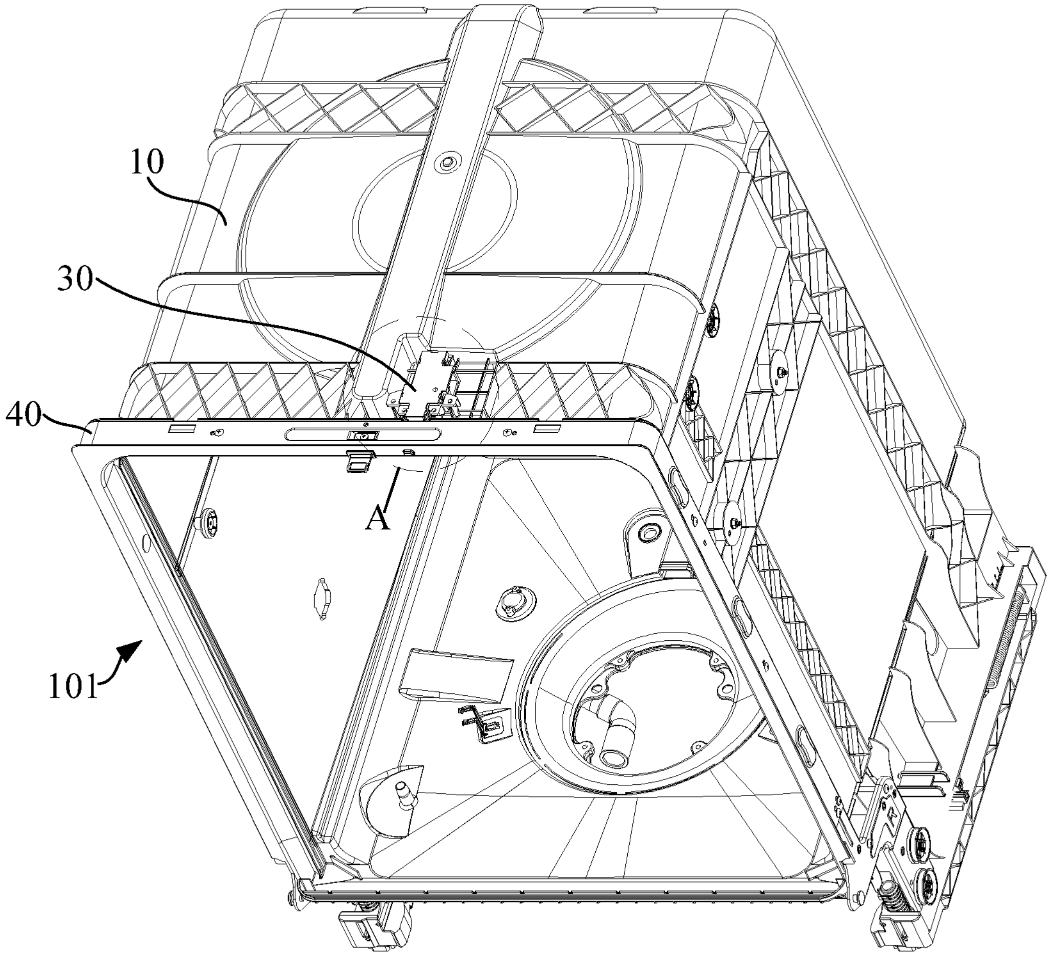
FIG. 3 is a structural schematic diagram of a mounting structure of an ejection mechanism of the dishwasher according to some embodiments of the present disclosure.
Figure 4:
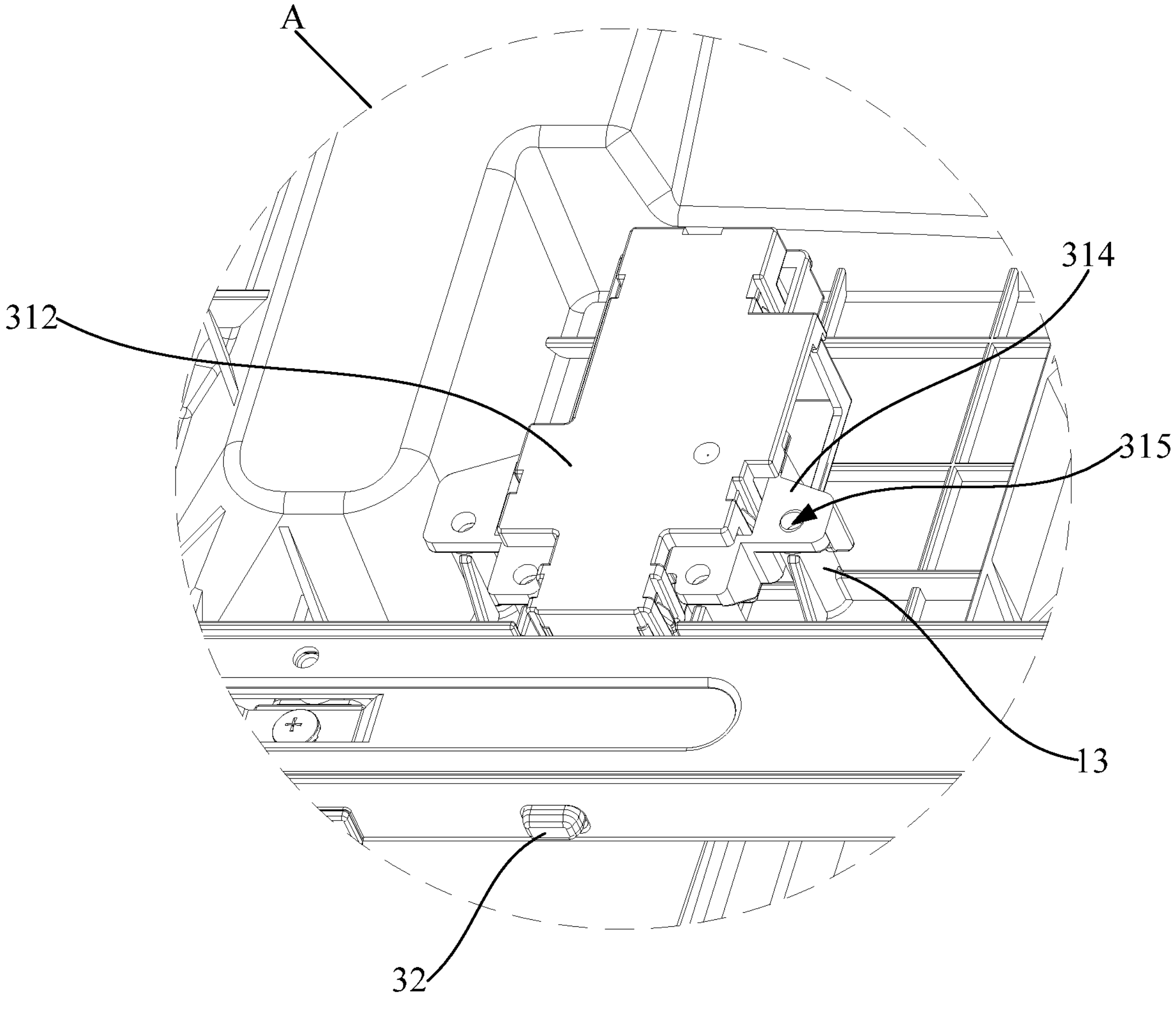
FIG. 4 is a partial enlarged view of a portion indicated by A in FIG. 3.
Figure 5:
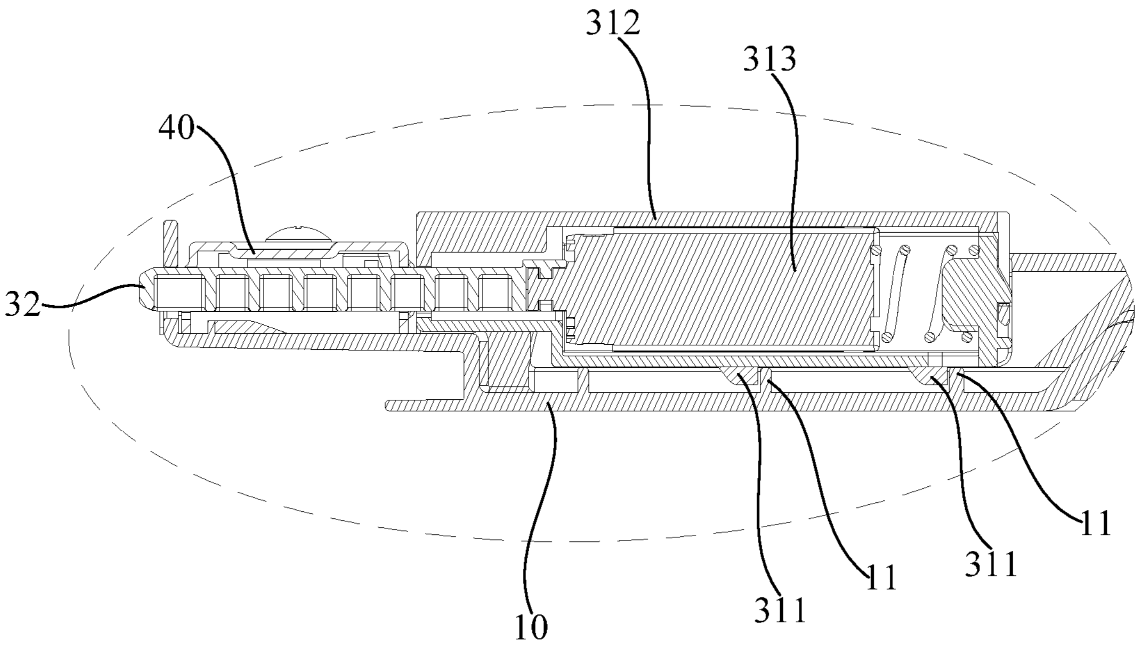
FIG. 5 is a schematic cross-sectional view of the mounting structure of the ejection mechanism in FIG. 4.
Figure 6:
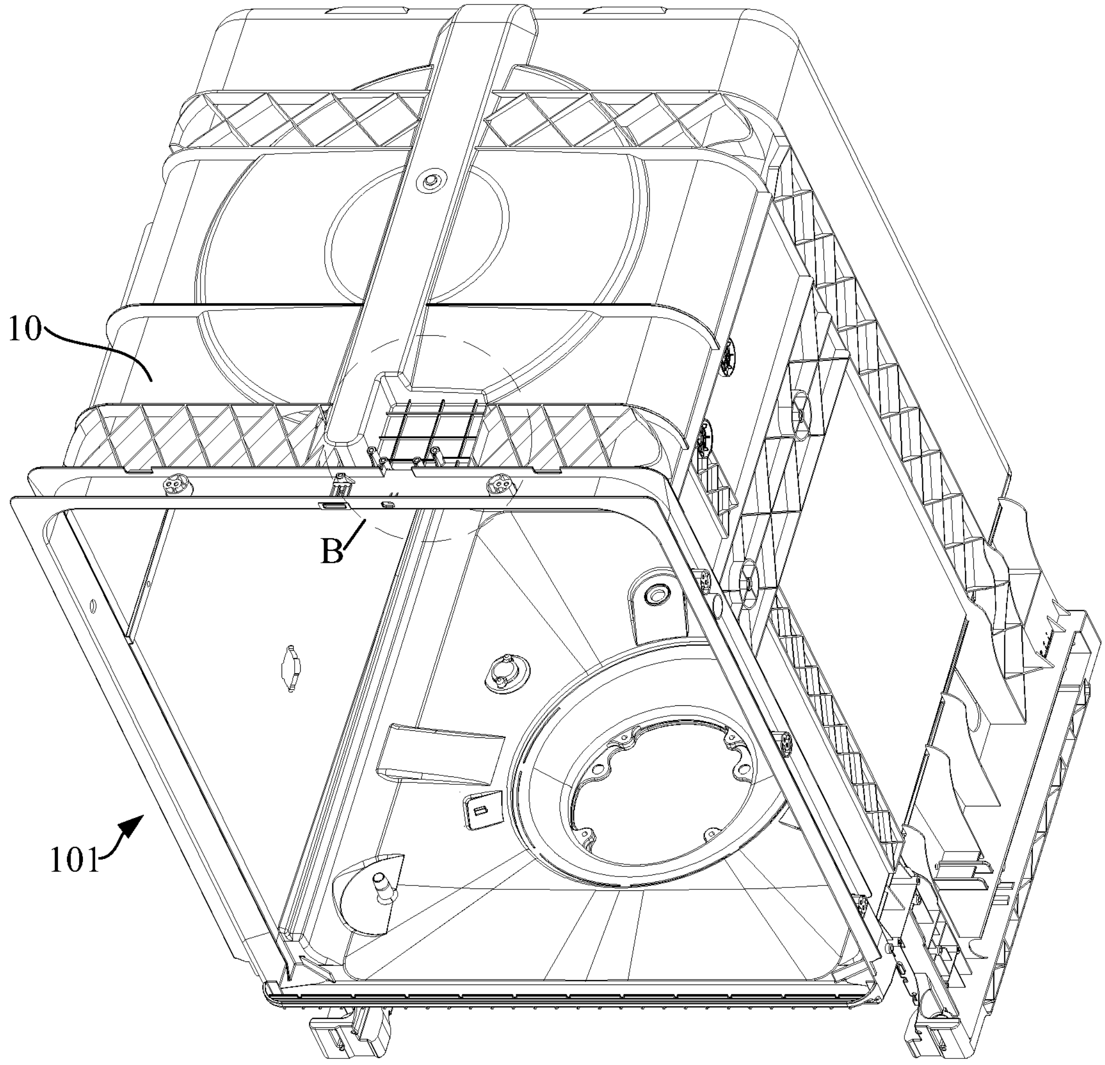
FIG. 6 is a schematic structural diagram of an inner container in FIG. 3.
Figure 7:
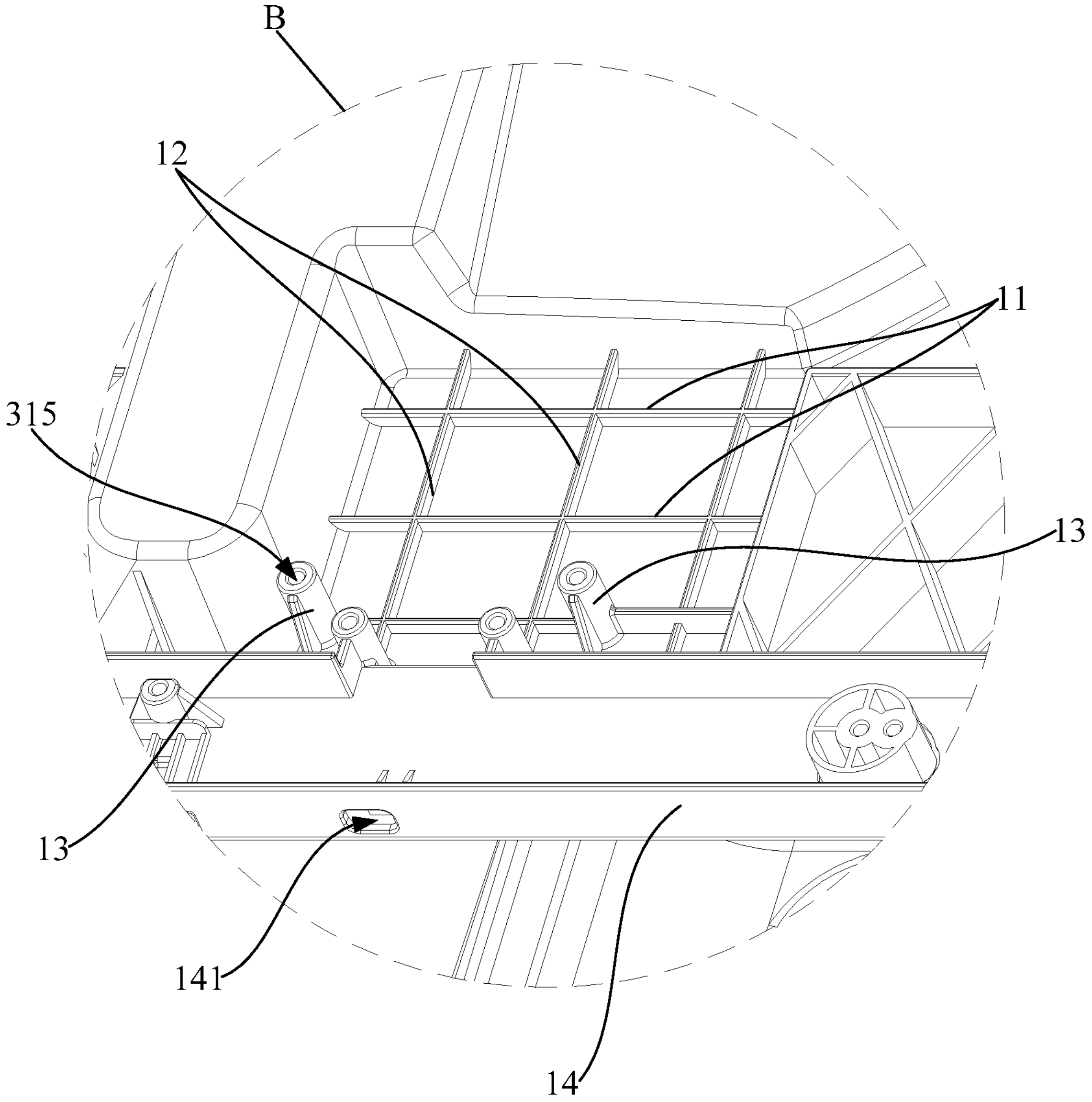
FIG. 7 is a partial enlarged view of a portion indicated by B in FIG. 6.

FIG. 3 is a structural schematic diagram of a mounting structure of an ejection mechanism of a dishwasher according to some embodiments of the present disclosure. FIG. 4 is a partial enlarged view of a portion indicated by A in FIG. 3. FIG. 5 is a schematic cross-sectional view of the mounting structure of the ejection mechanism in FIG. 4. FIG. 6 is a schematic structural diagram of an inner container in FIG. 3. FIG. 7 is a partial enlarged view of a portion indicated by B in FIG. 6.

As shown in FIG. 3 to FIG. 7, in some embodiment of the present disclosure, the mounting structure of the ejection mechanism 30 of the dishwasher 100 may include an inner container 10 and the ejection mechanism 30. The inner container 10 may have an open side 101 for mounting the door body 20, and be provided with a positioning rib 11. The ejection mechanism 30 may include the drive assembly 31 and the ejector 32 drivingly connected to the drive assembly 31. The drive assembly 31 may be used to drive the ejector 32 to perform a protruding and/or retracting movement between the open side 101 and the door body 20. The drive assembly 31 is arranged on the positioning rib 11, and fixedly connected to the inner container 10. The drive assembly 31 is also provided with a support foot 311 extending toward the positioning rib 11. The support foot 311 abuts against a side of the positioning rib 11 which is adjacent to the door body 20.

In some embodiments, the dishwasher 100 may include an inner container 10 and a door body 20. The inner container 10 may have a washing chamber and an opening which is in communication with the washing chamber, and a side of the inner container 10 provided with the opening is the open side 101. The door body 20 may be mounted at the open side 101 of the inner container 10 in an openable and/or closable manner, and used for opening or closing the opening of the inner container 10. The ejection mechanism 30 may include the drive assembly 31 and the ejector 32. The drive assembly 31 may be mounted on the inner container 10. An end of the ejector 32 may be drivingly connected to the drive assembly 31, and another end of the ejector may extend from the open side 101 of the inner container 10 toward the door body 20. The ejector 32 can be driven to perform the protruding and/or retracting movement between the open side 101 of the inner container 10 and the door body 20 by the drive assembly 31. When the door body 20 is closed, the ejector 32 is in a retracted position, and may not interfere with the normal closing of the door body 20. When the door body 20 needs to be opened, the drive assembly 31 may drive the ejector 32 to protrude from the open side 101 toward the door body 20, and the ejector 32 may be caused to exert the acting force on the door body 20 to realize an automatic opening of door.

In the technical solution of the present disclosure, the inner container 10 is provided with the positioning rib 11, and the drive assembly 31 is provided with the support foot 311 extending toward the positioning rib 11. During the assembly process, the drive assembly 31 is arranged on the positioning rib 11, and the support foot 311 is abutted against a side of the positioning rib 11 adjacent to the door body 20. Thus, a pre-positioning of the ejection mechanism 30 can be realized. Then the drive assembly 31 is fixedly connected to the inner container 10 by fasteners. Thus, a simple and convenient assembly can be achieved. When the door body 20 needs to be opened, the drive assembly 31 may drive the ejector 32 to protrude toward the door body 20. The ejector 32 may be caused to abut against the door body 20 to apply the acting force to the door body 20, and the door body 20 will produce a reverse acting force to the ejector 32. Since the support foot 311 abuts against a side of the positioning rib 11 adjacent to the door body 20, the support foot 311 can bear the reverse acting force from the door body 20 on the ejection mechanism 30, to avoid the ejection mechanism 30 from shifting and loosening after being repeatedly stressed, which can effectively improve the mounting reliability of the ejection mechanism 30. The above-described mounting structure of the ejection mechanism 30 of the dishwasher 100 can realize the pre-positioned mounting of the ejection mechanism 30, and can also improve the mounting reliability of the ejection mechanism 30.

It should be noted that, in some embodiments, the specific number of support foot 311 can be set according to actual needs, and can be one, two or more, which is not specifically limited here. The number of the positioning ribs 11 on the inner container 10 may be set according to actual needs. It can be that each support foot 311 is correspondingly provided with one positioning rib 11, or it can also be that a plurality of support feet 311 jointly abut against one positioning rib 11, as long as it is guaranteed that the support foot 311 can abut against and fit with the positioning rib 11.

As shown in FIG. 3 to FIG. 5, in some embodiments, the drive assembly 31 is fixed on a top of the inner container 10; a bottom of the drive assembly 31 is provided with the support foot 311; and the top of the inner container 10 is provided with the positioning rib 11. In some embodiments, the top of the inner container 10 is provided with the positioning rib 11, and the bottom of the drive assembly 31 is provided with the support foot 311. During the assembly process, a bottom surface of the drive assembly 31 is arranged on the positioning rib 11, and the support foot 311 abuts against a side of the positioning rib 11 adjacent to the door body 20, and then the drive assembly 31 is fixedly connected to the inner container 10 by the fasteners. The drive assembly 31 is fixed on the top of the inner container 10, and thus the inner container 10 can support the ejection mechanism 30 along a gravity direction of the ejection mechanism 30, to bear all gravity of the ejection mechanism 30, which can further ensure the mounting stability between the ejection mechanism 30 and the inner container 10. In other embodiments, the drive assembly 31 may also be fixed to a side portion of the inner container 10. Thus, accordingly, the positioning rib 11 may be provided on the side portion of the inner container 10, and the support foot 311 may be provided on a side of the drive assembly 31 opposite to the side portion of the inner container 10.

In some embodiments, since a bottom of the door body 20 of the dishwasher 100 is rotatably connected to the inner container 10 by a hinge, a top of the door body 20 can be rotatably opened and closed relative to the inner container 10. By arranging the ejection mechanism 30 on the top of the inner container 10, according to the lever principle, an arm of force between a point where the ejector 32 of the ejection mechanism 30 exerts the acting force on the door body 20 and a rotation axis of the door body 20 is relatively long. Thus, the door body 20 can be pushed to rotate by only a small driving force which is required to be output by the ejection mechanism 30. In this way, the door body 20 can be unlocked in a more labor-saving manner, and the driving requirements for the ejection mechanism 30 can be reduced. Thus, a cost can be reduced.

Figure 8:
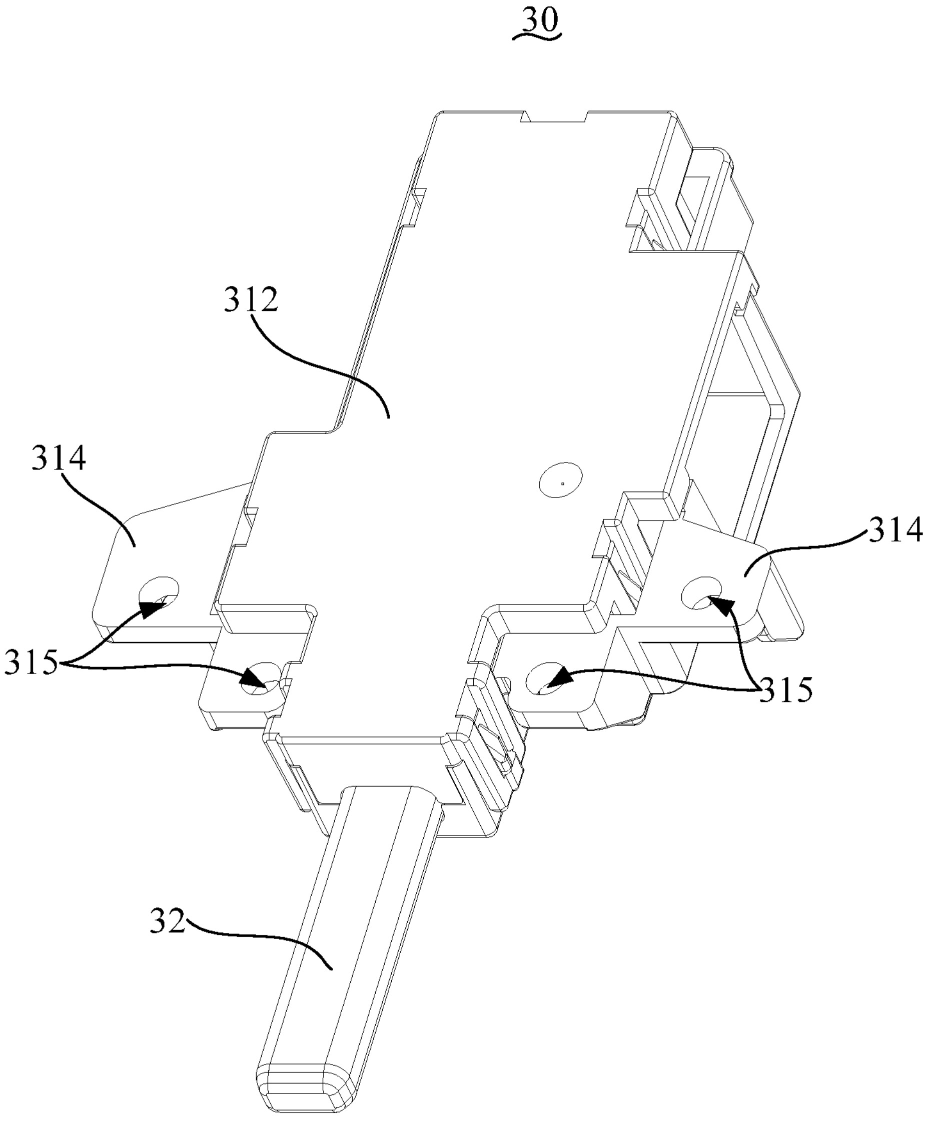
FIG. 8 is a structural schematic diagram of the ejection mechanism in FIG. 3.
Figure 9:
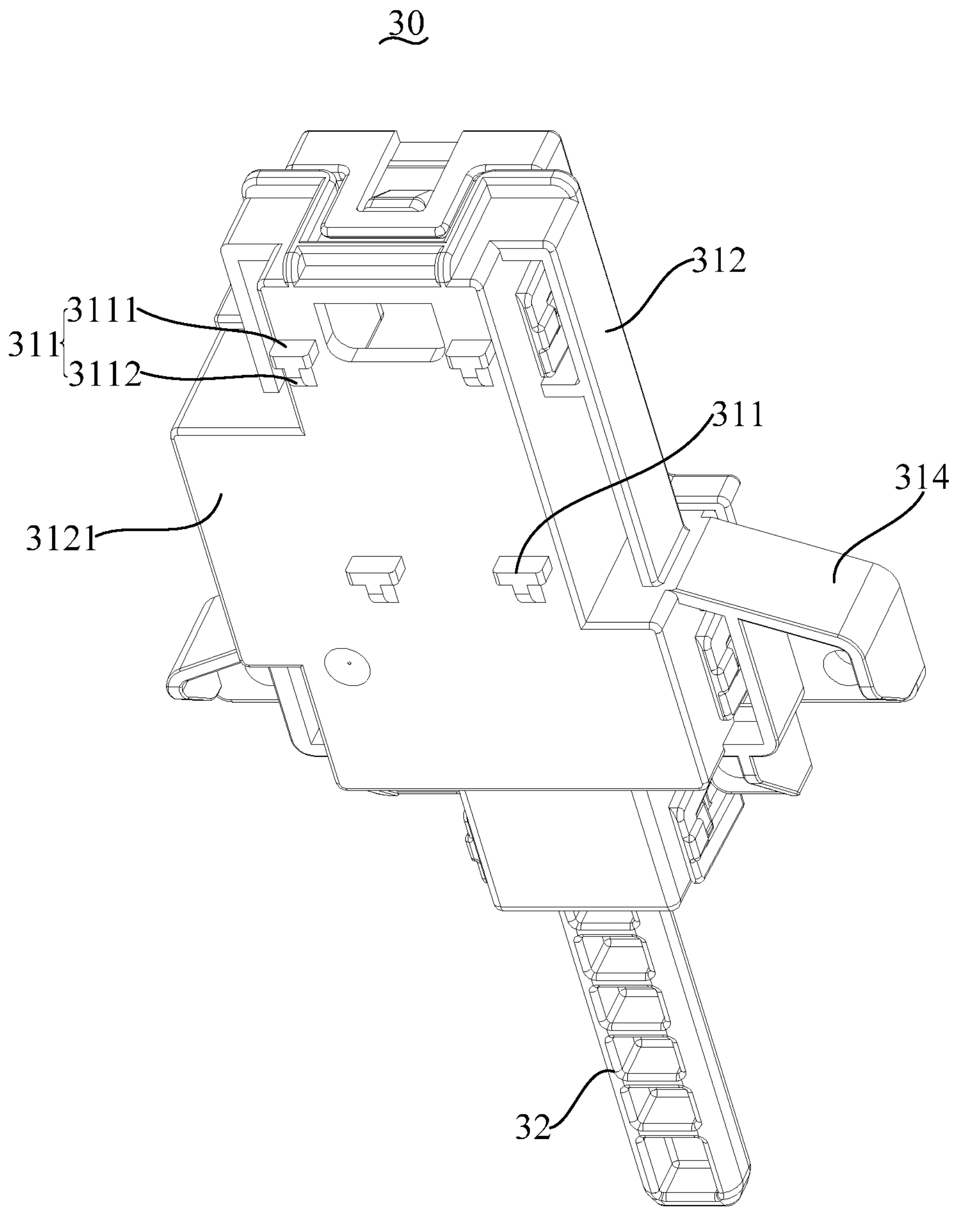
FIG. 9 is a structural schematic diagram of the ejection mechanism in FIG. 8 in another angle of view.

FIG. 8 is a structural schematic diagram of the ejection mechanism in FIG. 3. FIG. 9 is a structural schematic diagram of the ejection mechanism in FIG. 8 in another angle of view.

As shown in FIG. 9, in some embodiments, the support feet 311 may include: an abutting part 3111, which abuts against and fits with the positioning rib 11; and a reinforcement part 3112, which is arranged on a side of the abutting part 3111 away from the positioning rib 11. In some embodiments, as shown in FIG. 9, an extending direction of the abutting part 3111 may intersect with an extending direction of the reinforcing part 3112, to cause a cross-sectional area of the support foot 311 to be substantially T-shaped, making an overall structural strength of the support foot 311 higher and able to bear a larger reverse acting force, therefore further improving the mounting reliability of the ejection mechanism 30.

As shown in FIG. 5, in some embodiments, the drive assembly 31 may include a housing 312 and a drive unit 313 disposed in the housing 312. An end of the ejector 32 is drivingly connected to the drive unit 313, and another end of the ejector 32 passes out of the housing 312. The support foot 311 is arranged on a surface of the housing 312.

In some embodiments, the housing 312 can be formed by splicing two half-shells together. The two half-shells can be enclosed with each other to form a mounting cavity. The drive unit 313 is mounted in the mounting cavity of the housing 312. An end of the ejector 32 is drivingly connected to the drive unit 313, and another end of the ejector 32 passes out of the housing 312 and extends toward the door body 20. A bottom surface of the housing 312 is provided with the support foot 311. The specific number of the support feet 311 can be set according to actual needs, and may be one, two or more. In some embodiments, there are various structures of the drive unit 313. The drive unit 313 may include a wax motor and an elastic element. The wax motor is located between the ejector 32 and the elastic element. A driving end of the wax motor is connected to the ejector 32. An end of the elastic element is in elastic abutment with the wax motor, and another end of the elastic element is in elastic abutment with the housing 312. The wax motor, after energized, heated and expanded, can drive the ejector 32 to move. Another end of the ejector 32 can be caused to be able to protrude toward the door body 20 to apply a thrust to the door body 20, and therefore the door lock mechanism 50 is driven to be unlocked. In some embodiments, after the wax motor drives the ejector 32 to move to a limit position, the elastic element can be compressed, and the elastic element can play a role in buffering and adjusting deviation, ensuring the structural reliability of the ejection mechanism 30 and facilitating to reduce a production cost.

In order to further improve the mounting reliability of the ejection mechanism 30, as shown in FIG. 5 and FIG. 9, in some embodiments the housing 312 has a support surface 3121 abutted against the top of the positioning rib 11. The support surface 3121 is provided with a plurality of support feet 311 at intervals thereon, and each support foot 311 abuts against and fits with a corresponding positioning rib 11 on the inner container 10. By arranging a plurality of support feet 311 at intervals on the support surface 3121, when the ejection mechanism 30 is subject to the reverse acting force from the door body 20, each support foot 311 abuts against the corresponding positioning rib 11 to bear a stress. Thus, the reverse acting force borne by the ejection mechanism 30 can be distributed to avoid a single-point stress. Therefore, the mounting reliability of the ejection mechanism 30 can be further improved. In some embodiments, as shown in FIG. 9, the bottom surface of the housing 312 may form the support surface 3121, and the support surface 3121 is provided with four support feet 311. The four support feet 311 are arranged at intervals and evenly in two rows and two columns, which can realize four-point distributed stress, making the stress acting on the ejection mechanism 30 more balanced.

In order to further improve the mounting reliability of the ejection mechanism 30, as shown in FIG. 6 and FIG. 7, in some embodiments, a plurality of the support feet 311 are arranged in multiple rows at intervals in the protruding and/or retracting direction of the ejector 32. A plurality of the positioning ribs 11 in a same row corresponding to a plurality of the support feet 311 are connected to one another to form a transverse rib strip. By connecting the positioning ribs 11 in a same row to form the transverse rib strip, the structural strength of the positioning ribs 11 can be improved and thus a greater acting force can be generated. Moreover, a contact area between the support surface 3121 of the housing 312 and the transverse rib strip is larger. Thus, the ejection mechanism 30 can be supported more stably. In some embodiments, the bottom surface of the housing 312 forms a support surface 3121, and the support surface 3121 is provided with four support feet 311, the four support feet 311 being arranged in two rows and two lines at intervals in the protruding and/or retracting direction of the ejector 32. The two positioning ribs 11 corresponding to the two support feet 311 in a first row are connected to each other to form a transverse rib strip, and the two positioning ribs 11 corresponding to the two support feet 311 in a second row are connected to each other to form another transverse rib strip.

In some embodiments, as shown in FIG. 7, the inner container 10 is further provided with a longitudinal rib strip 12 which intersects with the transverse rib strip. The longitudinal rib strip 12 connect multiple rows of the transverse rib strips to one another. By arranging the longitudinal rib strips 12 to connect multiple rows of transverse rib strips to one another, the structural strength of the transverse rib strips can be further improved, to be capable of bearing a greater acting force. In some embodiments, the transverse rib strips may intersect substantially perpendicularly with the longitudinal rib strips 12. There are a plurality of the longitudinal rib strips 12 arranged at intervals in an extending direction of the transverse rib strips. A plurality of transverse rib strips intersect with a plurality of the longitudinal rib strips 12 to form grid-like rib positions. A drive assembly 31 is arranged on the grid-like rib positions, and is connected and fixed to the inner container 10 by fasteners. A support foot 311 of the drive assembly 31 abuts against a side of a corresponding transverse rib strip adjacent to the door body 20. Thus, the overall structure is stable, and the mounting reliability is high.

As shown in FIG. 4, FIG. 7 and FIG. 8, in order to facilitate the mounting of the ejection mechanism 30, in some embodiments, two opposite sides of the housing 312 are respectively provided with a mounting lug 314, and the inner container 10 is provided with a fixing column 13 corresponding to the mounting lug 314. The mounting lug 314 is overlapped on a top surface of the fixing column 13. The mounting lug 314 and the fixing column 13 are both correspondingly provided with assembling holes 315 for the fasteners to pass through for connecting. During the assembly process, the mounting lugs 314 on both sides of the housing 312 are respectively overlapped on the top surface of a corresponding fixing column 13, then the fasteners are passed through the assembling holes 315 for connecting, and then the mounting lugs 314 are fixedly connected to the fixing column 13. In some embodiments, the fasteners include but are not limited to screws, bolts and the like. In some embodiments, the number of mounting lugs 314 on both sides of the housing 312 and the number of the assembling holes 315 on the mounting lugs 314 can be set according to actual needs. In some embodiments, each of left and right sides of the housing 312 is provided with two mounting lugs 314. Each mounting lug 314 is provided with an assembling hole 315. The top surface of the inner container 10 is correspondingly provided with four fixing columns 13, and each fixing column 13 is provided with an assembling hole 315. The housing 312 can be fixedly connected to the inner container 10 by four fasteners, which can further ensure the mounting reliability of the ejection mechanism 30.

The inner container 10 is generally a plastic injection part, and thus the structural strength of an open side 101 of the inner container 10 is relatively weak. In order to improve the structural strength of the open side 101 of the inner container 10, in some embodiments, an outer periphery of the open side 101 is provided with a reinforcement rib 40. In some embodiments, as shown in FIG. 3, the reinforcement rib 40 is of a frame-like structure surrounding the outer periphery of the open side 101 of the inner container 10. The reinforcement rib 40 can be made of a sheet metal part with high structural strength. The ejection mechanism 30 is disposed at a position of the inner container 10 adjacent to its open side 101. The reinforcement rib 40 is provided with a through hole for the ejector 32 to pass through. The ejector 32 of the ejection mechanism 30 can pass through the through hole to an outside of the open side 101. In some embodiments, as shown in FIG. 7, an outer edge of the open side 101 of the inner container 10 is also provided with a turnup edge 14. The turnup edge can further enhance the structural strength of the inner container 10. The turnup edge 14 may be provided with a through hole 141 for the ejector 32 to pass through.

A dishwasher 100 is further provided according to some embodiments of the disclosure. The dishwasher 100 may include an inner container 10 and an ejection mechanism 30 mounted on the inner container 10. The mounting structure of the ejection mechanism 30 may refer to the above-mentioned embodiments. The dishwasher 100, adopting all the technical solutions of all the above-mentioned embodiments, at least has all beneficial effects brought by the technical solutions of the above-mentioned embodiments, which will not be repeated here.

The above is only some embodiments of the present disclosure, and does not therefore limit the scope of protection sought for by the present disclosure. Under the inventive concept of the present disclosure, any equivalent structural transformation made by using the description of the present disclosure and the contents of the accompanying drawings, or any direct/indirect application in other related technical fields is included in the scope of protection sought for by the present disclosure.

What is claimed is:

1. An ejection mechanism attached to an inner container of a dishwasher, the ejection mechanism comprising:

- an ejector configured to abut against a door body of the dishwasher; and
- a drive assembly configured to drive the ejector to extend in a direction toward the door body and comprising a support foot comprising:
  - an abutting part configured to abut against a positioning rib on the inner container; and
  - a reinforcement part arranged on a side of the abutting part away from the positioning rib.

2. The ejection mechanism according to claim 1, wherein:
the drive assembly is configured to be fixed on a top of the inner container;
the support foot is disposed on a bottom of the drive assembly; and
the positioning rib is disposed on the top of the inner container.

3. The ejection mechanism according to claim 2, wherein:
the drive assembly comprises a housing and a drive unit disposed in the housing;
an end of the ejector is connected to the drive unit;
another end of the ejector is configured to abut against the door body and passes through the housing; and
the support foot is arranged on a surface of the housing.

4. The ejection mechanism according to claim 1, wherein:
the drive assembly comprises a housing and a drive unit disposed in the housing;
an end of the ejector is connected to the drive unit;
another end of the ejector is configured to abut against the door body and passes through the housing; and
the support foot is arranged on a surface of the housing.

5. The ejection mechanism according to claim 4, wherein:
the support foot is one of a plurality of support feet extending from a support surface of the housing, the support feet configured to abut against respective positioning ribs on the inner container, where the positioning rib is one of the positioning ribs; and
the support surface is configured to abut against tops of the positioning ribs.

6. The ejection mechanism according to claim 5, wherein the support feet are arranged in multiple rows in the direction.

7. The ejection mechanism according to claim 4, wherein:
the housing comprises a plurality of mounting lugs configured to overlap respective fixing columns of the inner container; and
the mounting lugs comprise respective assembling holes for fasteners to pass therethrough.

8. A dishwasher comprising:
an inner container having an open side and a positioning rib;
a door body mounted to the inner container; and
an ejection mechanism attached to the inner container and comprising:
an ejector configured to abut against the door body; and
a drive assembly configured to drive the ejector to extend in a direction toward the door body and comprising a support foot comprising:
an abutting part abutting against the positioning rib; and
a reinforcement part arranged on a side of the abutting part away from the positioning rib.

9. The dishwasher according to claim 8, wherein:
the drive assembly is fixed on a top of the inner container;
the support foot is disposed on a bottom of the drive assembly; and
the positioning rib is disposed on the top of the inner container.

10. The dishwasher according to claim 8, wherein:
the drive assembly comprises a housing and a drive unit disposed in the housing;
an end of the ejector is connected to the drive unit;
another end of the ejector is configured to abut against the door body and passes through the housing; and
the support foot is arranged on a surface of the housing.

11. The dishwasher according to claim 10, wherein:
the support foot is one of a plurality of support feet extending from a support surface of the housing;
the positioning rib is one of a plurality of positioning ribs on the inner container;
the support feet are configured to abut against respective positioning ribs of the positioning ribs; and
the support surface is configured to abut against tops of the positioning ribs.

12. The dishwasher according to claim 11, wherein
the support feet are arranged in multiple rows in the direction; and
a plurality of the positioning ribs corresponding to a plurality of the support feet in a same row are connected to one another to form a transverse rib strip.

13. The dishwasher according to claim 12, wherein:
the transverse rib strip is one of a plurality of transverse rib strips corresponding to respective rows of support feet; and
the inner container comprises a longitudinal rib strip connecting the transverse rib strips.

14. The dishwasher according to claim 10, wherein:
the housing comprises a plurality of mounting lugs configured to overlap respective fixing columns of the inner container; and
the mounting lugs comprise respective assembling holes for fasteners to pass therethrough.

15. The dishwasher according to claim 10, further comprising a reinforcement rib disposed on an outer periphery of the open side.

* * * * *